Aug. 28, 1962     E. A. HAYDEN     3,051,203
LUMBER SAW ATTACHMENT FOR CHAIN SAWS
Filed Dec. 28, 1959     2 Sheets-Sheet 1
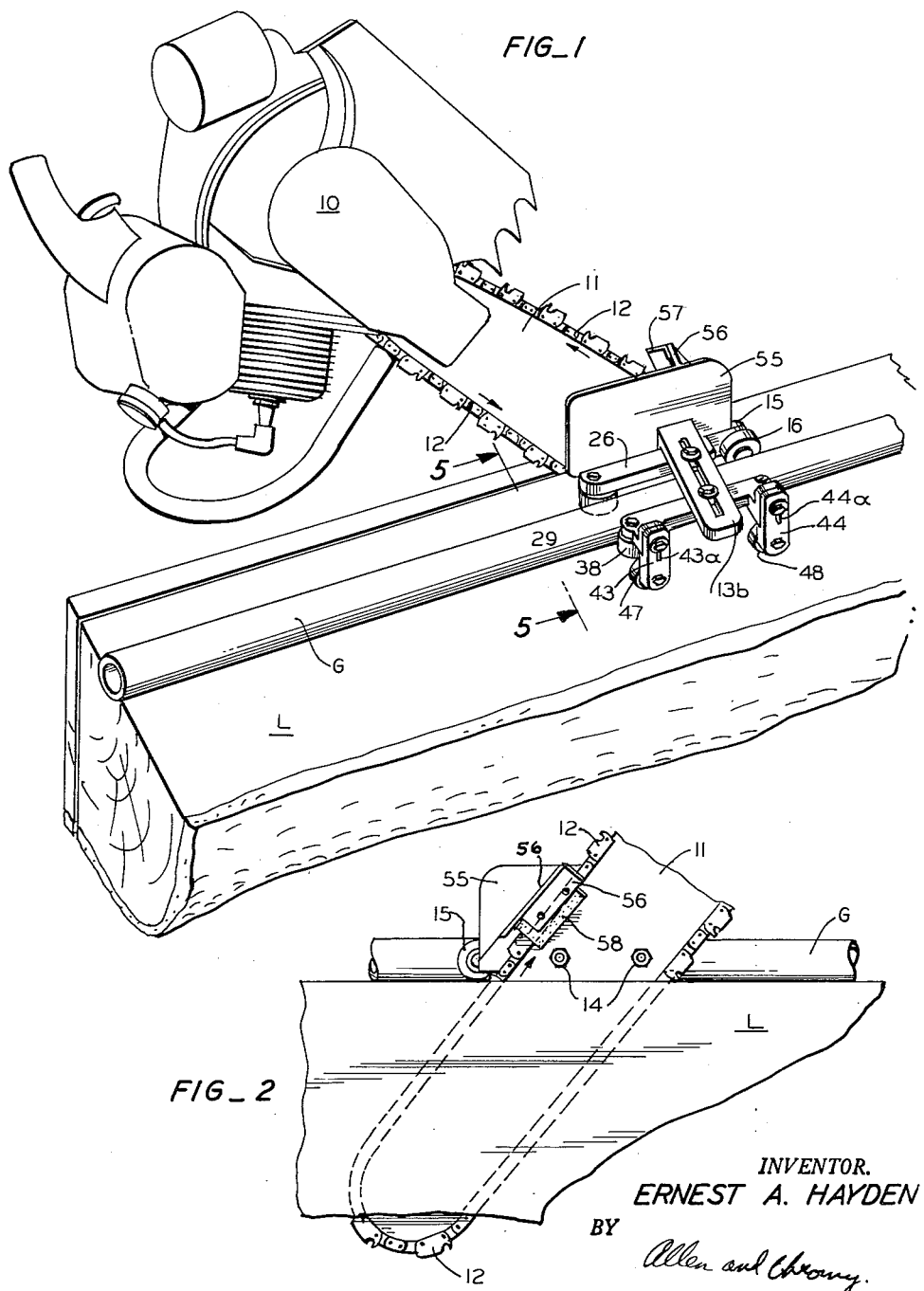
INVENTOR.
ERNEST A. HAYDEN Aug. 28, 1962   E. A. HAYDEN   3,051,203
LUMBER SAW ATTACHMENT FOR CHAIN SAWS
Filed Dec. 28, 1959   2 Sheets-Sheet 2
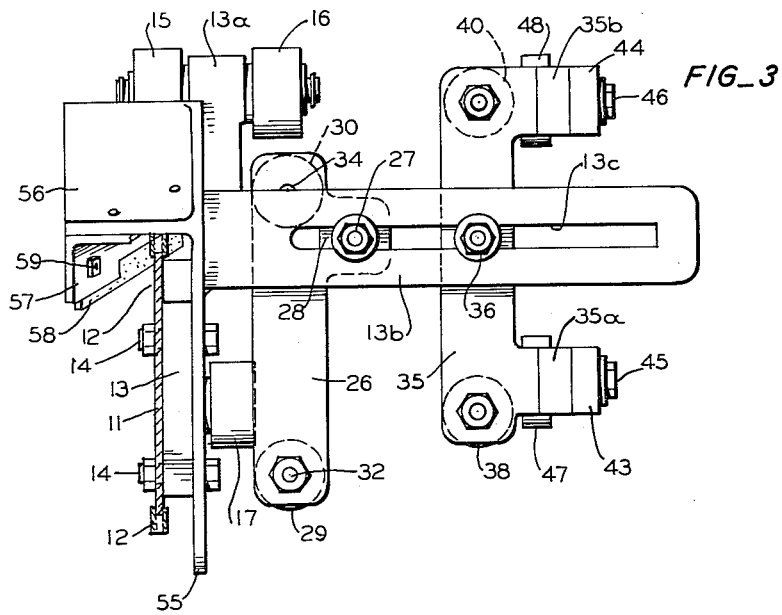
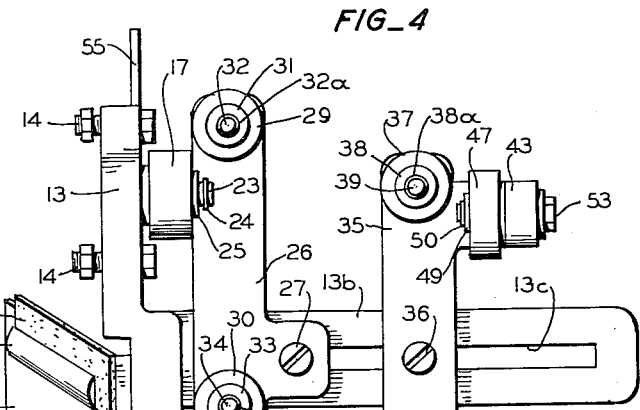
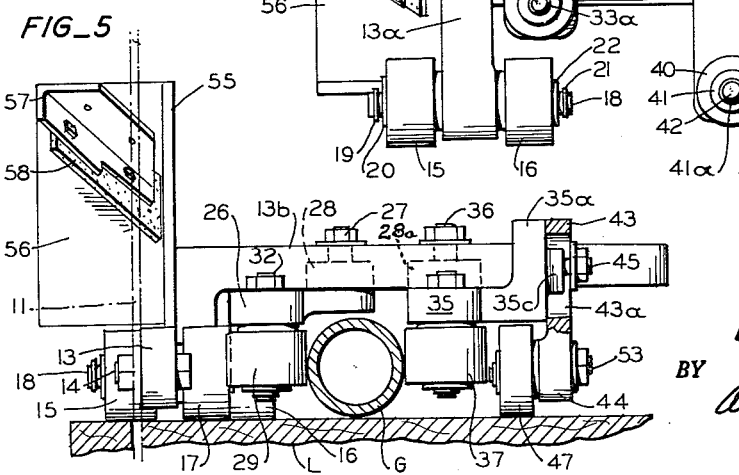
INVENTOR.
ERNEST A. HAYDEN
BY
Allen and Chromy
ATTORNEYS

United States Patent Office 3,051,203
Patented Aug. 28, 1962

3,051,203
LUMBER SAW ATTACHMENT FOR CHAIN SAWS
Ernest A. Hayden, P.O. Box 248, Callahan, Calif.
Filed Dec. 28, 1959, Ser. No. 862,357
3 Claims. (Cl. 143—32)

This invention relates to guides for saws in general. More particularly, this invention relates to a guide which may be attached to a portable saw for use in sawing lumber from logs and the like.

An object of this invention is to provide a lumber sawing attachment for chain saws and the like whereby the saw may be used for ripping or cross-cutting wood forms such as squaring of logs, trimming off sides of boards or planking, squaring the sides of logs and like operations.

Another object of this invention is to provide an attachable carriage for chain saws or similar portable power saws which carriage attachment is adapted to engage a surface of the member being sawed to support the saw at an angle such that the saw is provided with a self-actuating feeding action so that it feeds into the work with a minimum of effort on the part of the operator.

Still another object of this invention is to provide a roller carriage attachment for chain saws which is adapted to be attached to the chain saw bar so that the carriage is rolled along a flat surface of the log as the chain saw engages the log in the sawing operation.

Other and further objects of this invention will be apparent to those skilled in the art to which it relates from the following specification, claims and drawing.

In accordance with this invention, there is provided a lumber-sawing attachment which may be used for guiding a chain saw or other portable power driven saw in the cutting of boards or other lumber members from logs directly in the forest or farmyard without necessitating hauling the logs to a saw mill. This attachment may be used simply by providing a flat surface to one side of the log and this flat surface may consist either of a board or of a sawed surface of the log itself. A guide member which may be in the form of a pipe or similar elongated substantially straight member is attached to this flat surface to cooperate with certain vertically disposed rollers provided to the attachment so that the saw equipped with this attachment may be guided along the length of the log in the sawing operation. Furthermore, the attachment is provided to the saw at an angle such that the saw is positioned so that it urges itself into the log and as a result it is unnecessary for the operator to exert substantial force on the sawing apparatus to make it perform the cutting operation. The positioning angle of the saw has been predetermined so that the saw does not progress too rapidly into the log, thereby overloading the motor. However, different angles may be used depending upon the hardness and texture of the logs that it is desired to cut. Furthermore, with this attachment the starting of the cut in the end of a log is simplified inasmuch as this may be done by resting the forward supporting rollers of the attachment on the end of the log straddling the end of the guide member and gradually bringing the cutting element or saw blade of the apparatus into engagement with the end of the log.

Further features and details of this invention will be set forth in the specification, claims and drawing in which briefly:

FIG. 1 is a side view of this invention showing it in position on a log;

FIG. 2 is a fragmentary view of the saw from the opposite side to that shown in FIG. 1;

FIG. 3 is a detail top view of the sawing attachment;

FIG. 4 is a detail bottom view of this lumber-sawing attachment; and

FIG. 5 is a rear view of this lumber-sawing attachment.

In FIGURE 1 this apparatus is shown in the process of sawing a board off of the side of the log L as the saw is guided down the length of the log by the guide G which is attached to the top of the log. After the board is sawed off of the log and it is desired to saw another board of corresponding width therefrom, the guide G is moved over a distance equal to the thickness of the board desired plus the kerf. After the guide G is affixed to the log in its new position another board may be sawed therefrom. On the other hand if it is desired to split the log into two parts the guide G may be positioned for this purpose so that the saw is guided down the center of the log. In sawing operations where the log is not provided with a flat sawed surface a suitable board may be positioned on the top of the rough log and affixed thereto and thereafter the guide G may be attached to the top surface of this board so that a suitable flat surface is provided on which the lumber sawing attachment may be rolled.

The lumber sawing attachment of this invention is adapted for use with a chain saw employing a small portable internal combustion engine 10 for driving the chain saw 12 around the saw bar 11 which is attached by means of the bolts 14 to the frame 13 of the guide attachment. The chain saw is of conventional construction and may be, for example, of the type manufactured by Homelite Company. The lumber sawing attachment of this invention is bolted to the chain saw bar 11 at an angle such that the saw, which is driven in the direction indicated by the arrows shown in FIGURE 1, tends to feed itself into the log L and the operator does not have to force it into the wood.

The lumber sawing attachment is provided with a frame 13 which may be cast out of aluminum or alloys thereof to reduce the weight thereof and this frame is provided with integral extending members 13a and 13b. A roller 17 is mounted on a bearing pin 23 which is fixedly positioned in the frame 13 and additional rollers 15 and 16 which are mounted on a shaft 18 are provided to the forward end of the frame member 13a as shown in the bottom view FIG. 4. These rollers 15, 16 and 17 extend down below the frame so that they engage the top of a log L when the attachment is in use as shown in FIG. 5.

The rollers 15 and 16 are retained on the shaft 18 by means of the washers 20, 21, respectively, which are in turn prevented from slipping off of the shaft by means of the split rings 19 and 20, respectively, that are positioned in suitable grooves formed in the end portions of the shaft. A similar arrangement including the washer 25 and the split washer or ring 24 is employed for retaining the roller 17 on the bearing shaft 23.

The frame member 13b is provided with a longitudinal slot 13c which is adapted to receive the bolts 27 and 36 that are employed for attaching the cross pieces 26 and 35, respectively, to the frame member 13b so that the positions of these cross-pieces may be adjusted. Projections 28 and 28a are formed integral with the cross-pieces 26 and 35 respectively, to engage the internal side walls of the slot 13c and prevent said cross-pieces from turning with respect to the frame member 13b during use of this apparatus.

The crosspiece 26 is provided for the purpose of supporting rollers 29 and 30 which are attached thereto by the bearing shafts 32 and 34, respectively, that are fixedly attached to this crosspiece. The rollers 29 and 30 are retained on the bearing shafts by means of the washers 31 and 33, respectively, which are held on the shafts by means of the split rings 32a and 33a, respectively. Thus, these rollers 29 and 30 are supported in a vertical position so that they are adapted to engage one side of the elongated guide member G which is attached to a sawed or flat surface of the log L and extends over the length thereof.

Additional rollers 37 and 40 are supported on the crosspiece 35 to engage the guide member G on the other side thereof. These additional rollers 37 and 40 are supported on the crosspiece 35 by means of the bearing shafts 39 and 42, respectively and suitable washers 38 and 41 are provided for the purpose of retaining these rollers in position on the respective bearing shafts. Suitable split rings 38a and 41a are provided for retaining the washers on these bearing shafts.

The crosspiece 35 is provided with upwardly extending projections 35a and 35b near the end portions thereof to which the members 43 and 44, respectively, are attached by means of the bolts 45 and 46, respectively. Each of the members 43 and 44 is provided with a slot such as the slot 43a shown in FIGURE 4, into which the projection 35c is adapted to extend, to hold these members in vertical position. These slots 43a and 44a provide means for a certain amount of vertical adjustment whereby the rollers 47 and 48 may be adjusted in the vertical position to insure that the saw will run in the vertical plane.

The rollers 47 and 48 are supported on the bottom end portions of the members 43 and 44, respectively by means of the bearing shafts 53 and 54, respectively. Suitable washers 49 and 51 and split rings 50 and 52 are provided to these respective shafts for retaining the rollers 47 and 48 thereon.

A plate 55 is attached to the frame 13 by means of suitable screws and this plate is provided with a laterally extending portion 56 which extends up over the saw portion immediately over the cut in the log so that the sawdust and small wood particles being carried out of the cut by the saw are deflected thereby. In addition, the flexible flap member 58 is attached to the angle member 57 which is supported by the laterally extending portion 56 so that the saw dust and other wood particles are deflected to the side instead of flying back onto the engine 10 and into the operator's line of vision. Suitable attaching means employing a strip 60 and bolts 59 are employed for holding the flexible flap 58 on the angle member 57.

While I have described a preferred embodiment of this invention in detail, it is to be understood that various modifications may be made therein without departing from the spirit and scope of this invention, and therefore I do not desire to limit this invention to the exact details described and illustrated, except insofar as they may be defined by the claims.

What I claim is:

1. In portable apparatus for sawing lumber from logs and the like the combination of a portable power driven saw having a saw bar, a frame, means for attaching said frame to the saw bar of said power driven saw so that said frame extends laterally to the side of the cutting element thereof for supporting said saw in a substantially vertical position during the sawing operation, a guide positioned on the log being sawed, said frame having a pair of adjustable cross members, one of said cross members being positioned on one side of said guide and the other of said cross members being positioned along the other side of said guide, means attached to said cross members engaging the opposite sides of said guide, a plurality of rollers, means for pivotally attaching the plurality of rollers to said frame for supporting said frame on a sawed surface of the log whereby said saw supported by said frame and said rollers may be rolled along on said sawed surface as the saw cuts into the log, said first mentioned attaching means including means for supporting said saw at an angle such that the cutting element of the saw urges itself into the log during the sawing operation.

2. In portable apparatus for sawing lumber from logs and the like the combination of a portable power driven chain saw having a saw bar, a frame, means comprising a pair of bolts for attaching said frame to said saw bar so that said frame extends laterally to the side of the cutting element of said power driven saw, a guide positioned on the log being sawed and extending over the length thereof, said frame having a pair of adjustable cross members, one of said cross members being positioned on one side of said guide and the other of said cross members being positioned along the other side of said guide, a plurality of rollers attached to said cross members engaging the sides of said guide, an additional plurality of rollers, means for pivotally attaching the additional plurality of rollers to said frame for supporting said frame on a substantially flat surface associated with the log whereby said saw supported by said frame and said additional rollers may be rolled along on said substantially flat surface as the saw cuts into the log, said saw bar being attached to said frame by said bolts at an angle such that the cutting element thereof urges itself into the log during the sawing operation.

3. An apparatus adapted to be attached to the saw bar of a portable power driven chain saw whereby the chain saw is adapted for sawing lumber from logs and the like, the combination comprising a frame, means comprising a plurality of bolts for attaching said frame to the saw bar of the chain saw so that said frame extends laterally to the side of the cutting element of said chain saw, a guide position on the log being sawed and extending over the length thereof, said frame having a pair of adjustable cross members, one of said cross members being positioned on one side of said guide and the other of said cross members being positioned along the other side of said guide, a plurality of rollers attached to said cross members engaging the sides of said guide, an additional plurality of rollers, means for pivotally attaching the additional plurality of rollers to said frame for supporting said frame on a substantially flat surface associated with the log whereby said saw supported by said frame and said additional rollers may be rolled along on said substantially flat surface as the saw cuts into the log, said frame being attached to said saw bar by said bolts at any one of a plurality of angles for cutting different kinds of wood.

References Cited in the file of this patent

UNITED STATES PATENTS

| 757,626 | Kottmann | Apr. 19, 1904 |
| 1,543,165 | Kessler | June 23, 1925 |
| 2,722,952 | Snyder | Nov. 8, 1955 |
| 2,779,359 | Koski | Jan. 29, 1957 |

FOREIGN PATENTS

| 540,098 | Germany | Dec. 9, 1931 |
| 216,747 | Switzerland | Jan. 4, 1942 |
| 941,406 | France | July 19, 1948 |